United States Patent [19]

Hasbrouck

[11] 4,081,175

[45] Mar. 28, 1978

[54] GATE VALVE FABRICATED FROM PIPE

[75] Inventor: Thad M. Hasbrouck, Wethersfield, Conn.

[73] Assignee: United Technologies Corporation, Hartford, Conn.

[21] Appl. No.: 749,207

[22] Filed: Dec. 9, 1976

[51] Int. Cl.² .............. F16K 3/316; F16K 27/04
[52] U.S. Cl. ................... 251/327; 251/367; 251/329
[58] Field of Search ............... 251/329, 367, 366, 327

[56] References Cited

U.S. PATENT DOCUMENTS

| | | | |
|---|---|---|---|
| 2,956,580 | 10/1960 | Heath | 251/329 X |
| 3,290,003 | 12/1966 | Kessler | 251/367 X |

FOREIGN PATENT DOCUMENTS

| | | | |
|---|---|---|---|
| 1,271,227 | 7/1961 | France | 251/329 |
| 1,291,056 | 3/1962 | France | 251/329 |
| 457,839 | 4/1975 | U.S.S.R. | 251/366 |

*Primary Examiner*—Arnold Rosenthal
*Attorney, Agent, or Firm*—Charles A. Warren

[57] ABSTRACT

A gate valve for a large diameter conduit that is fabricated to a great extent from standard structural shapes to avoid the need for expensive patterns and castings and associated machining requirements.

5 Claims, 3 Drawing Figures

GATE VALVE FABRICATED FROM PIPE

BACKGROUND OF THE INVENTION

The conventional gate valve is made up of carefully machined castings that require patterns, and molds for making them. The result is a long delay between ordering of the valves and the completion and delivery. Many times this delay is not acceptable as it may excessively delay completion of the project utilizing these valves. In many instances the cost of and the time required in making precisely machined valve parts including the main housing would be prohibitive and prevent use of such a valve. If such a valve were made to order, the time required would mean that the valve would not be available when needed. It may be desirable to make such valves from available structural shapes such as pipes or tubes, and plates which may be welded into the desired valve construction.

SUMMARY OF THE INVENTION

The principal feature of this invention is a gate valve construction in which most of the parts of the valve are made up of conventional metal shapes such as plates, sheets, rods, etc., thereby permitting construction of a valve at a minimum cost and within a short time. Another feature is the adaptability of this construction to various sizes of gate valves limited only to the structural shapes available.

According to the invention, the valve housing is made up of a cylinder, larger in diameter than the dimension of the conduit for which the valve is needed. The cylinder has short sections of pipe of the dimension of the conduit welded crosswise of the cylinder, with the inner ends of the sections spaced apart to accept the gate valve elements. Guide plates made of flat sheet stock are supported within the cylinder in alignment with the pipe ends to guide the valve elements into and out of closed position, and the ends of the cylinder are closed by flat discs, one of which is modified so as to be removable.

The foregoing and other objects, features, and advantages of the present invention will become more apparent in the light of the following detailed description of preferred embodiments thereof as illustrated in the accompanying drawing.

DESCRIPTION OF THE PREFERRED EMBODIMENT

Figure 1:
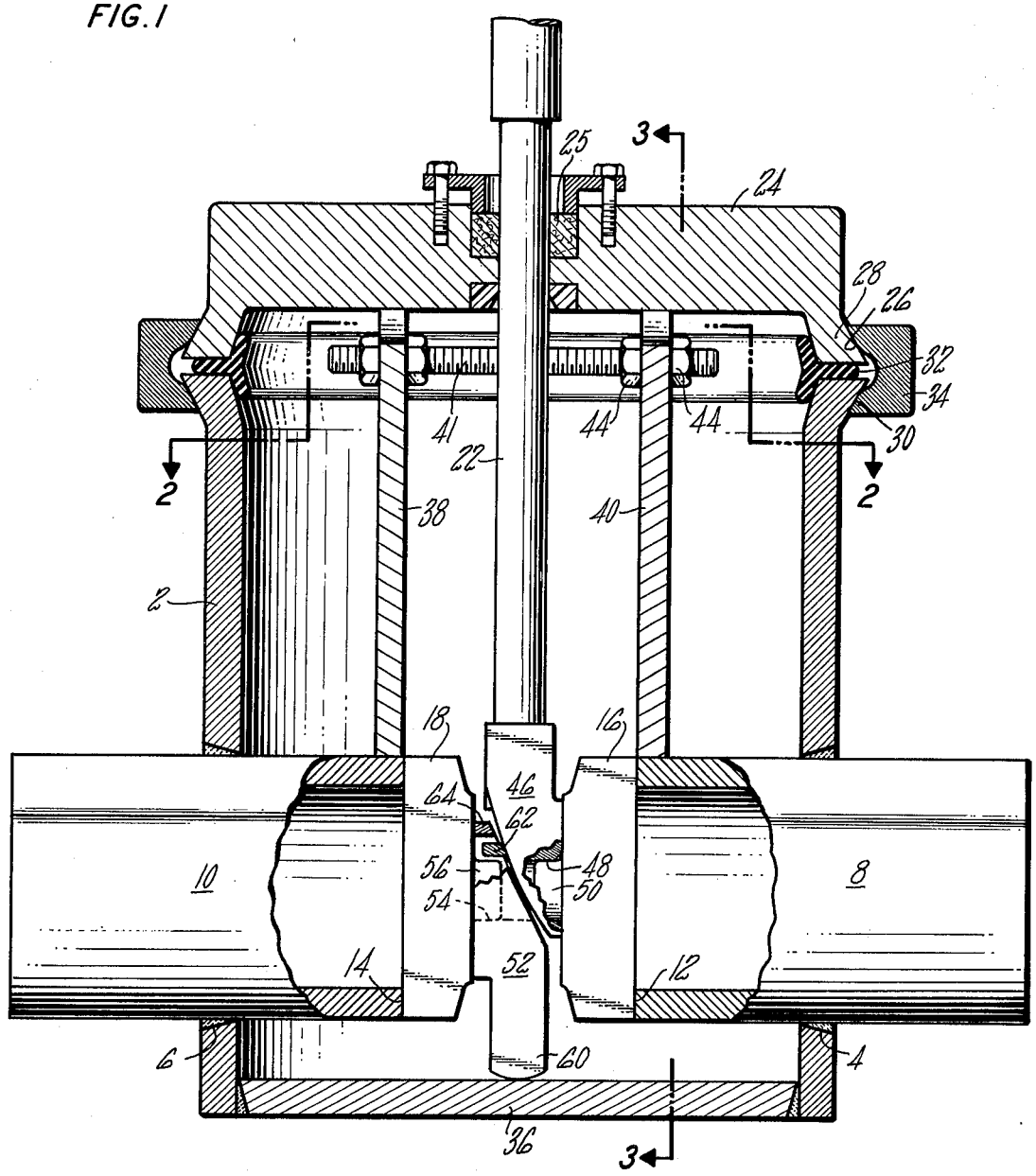
FIG. 1 is a sectional view longitudinally through the valve.
Figure 2:
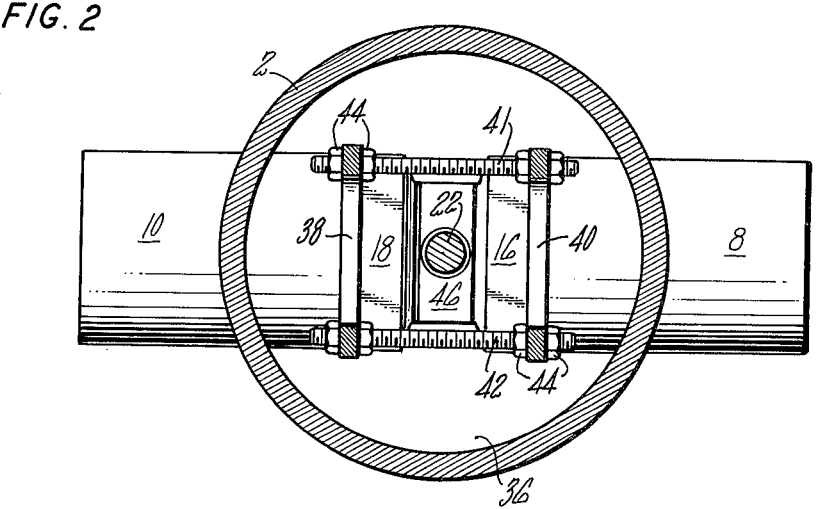
FIG. 2 is a sectional view along line 2—2 of FIG. 1.
Figure 3:
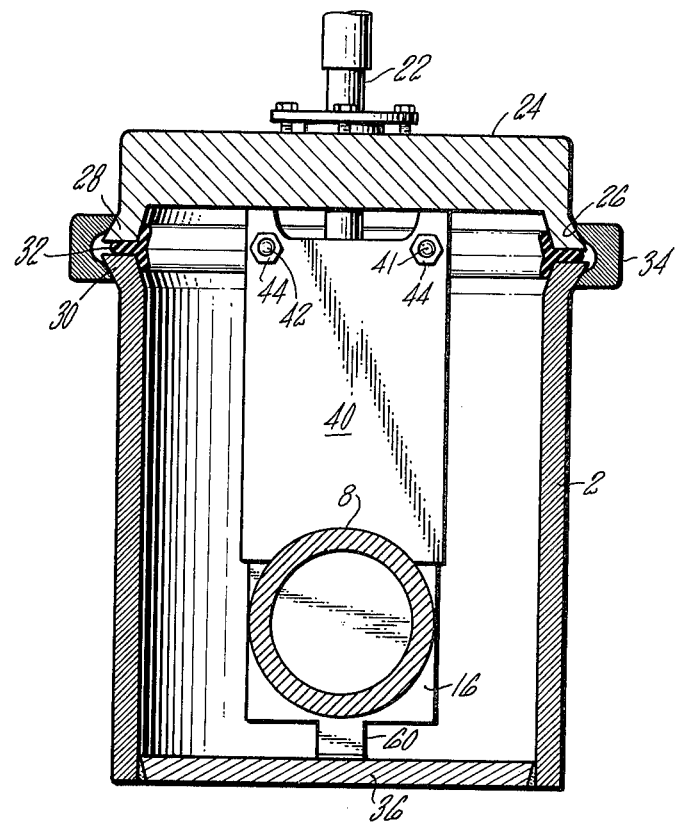
FIG. 3 is a sectional view along line 3—3 of FIG. 1.

As shown, the valve housing is a cylinder 2 of larger diameter than the conduit for which the valve is adapted that is to say the valve diameter. This housing has aligned, diametrically arranged holes 4 and 6 in which short sections of pipe 8 and 10 corresponding to the conduit dimension are welded. The inner ends 12 and 14 of the pipe sections are precisely spaced apart and aligned to receive therebetween the valve elements or discs 16 and 18 by which the valve is opened or closed. Each disc is so dimensioned as to engage and close the inner ends 12 and 14, respectively, of the pipe sections.

These valve discs are interconnected by a support structure which engages with an actuating rod 22 extending through a bonnet 24 on the upper end of the housing 2. This bonnet has a seal 25 to permit axial motion of the rod and the latter is actuated by a means, not shown, to open or close the valve.

The bonnet 24 may be secured as desired to the housing. For ease of removal of the bonnet, the latter may have a frusto-conical-shaped rib 26 on an integral flange 28 on the bonnet and the adjacent end of the housing has a cooperating frusto-conical rib 30. A suitable ring seal 32 is positioned at this point and the conical ribs are engaged by a surrounding clamping ring 34 to hold the bonnet and housing together. The bottom end of the housing is closed by a flat disc 36 welded therein.

As a guide for the valve discs, two flat plates 38 and 40 are positioned with their adjacent surfaces aligned with the end surfaces 12 and 14 of the pipe sections. These plates extend between and engage with the pipe sections and the bonnet 24 and are thus held securely in position within the housing. For precise spacing of these plates they may be held by threaded rods 41 and 42 extending between and through the plates with suitable nuts 44 engaging on both sides of both plates as shown.

As above stated most of the valve is made of conventional structural shapes. The housing 2, bonnet 24, the end cap 36, the pipe sections 8 and 10, the plates 38 and 40, the rod 22 (of two diameters of rod), and the valve discs 16 and 18 may all be machined out of standard structural shapes. To make the frusto-conical rib 30, a strip of sheet stock may be welded to the end of the pipe 2 and then machined to dimension. The bonnet 24 may be plate stock drilled to receive the actuating rod and with a ring formed of sheet welded to the underside and then machined to form the conical surface 26. The result is a valve that can readily be made with a minimum of cost from material readily available and requiring a minimum of machining. Even the valve discs may be machined from plate stock and welded up to form the movable valve element.

The support structure 29 for the valve discs includes a wedge element 46 on the actuating rod 22 having a recess 48 on the back side to receive a boss 50 on the disc 16 and a cooperating wedge element 52 has a recess 54 to receive a boss 56 on the disc 18. Thus as the actuating rod is moved toward closing position, there is no lateral closing pressure on the discs until a projection 60 on wedge element 52 engages the end closure 36 at which time the valve disc 18 is in alignment with the pipe section 10. With continued closing movement of the rod, the wedge section 46 continues to move and the wedge action moves the discs laterally into tight valve closing position. As the valve is opened, opening movement of the rod first moves the element 46 to relieve the lateral pressure, and continued movement carries both wedge elements and the attached valve discs into open position. Cooperating detents 62 and 64 on wedge elements 46 and 52, respectively, assure opening movement of both valve discs in unison.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. A gate valve including:

a cylindrical housing of a large diameter, said housing having aligned transverse openings therein and aligned pipe sections of smaller diameter than the housing welded in said transverse openings with the inner ends of the pipe sections in spaced parallel relation to each other, spaced guide plates positioned in said housing and having opposed inner surfaces with these inner surfaces of the plates parallel to and aligned with the inner ends of the pipe sections, a pair of valve discs spaced from one another and positioned between and guided by said plates for movement into and out of alignment with the pipe sections, end closures at opposite ends of the cylindrical housing, one closure being removable, and an actuating valve stem supporting said discs and extending through the removable end closures for moving the discs as a unit to open or close the valve, said guide plates extending between said pipe section ends and said removable end closure and in contact with both to be held in position thereby.

2. A gate valve as in claim 1 in which the other end closure for the housing is a flat disc welded to the end of the housing.

3. A gate valve as in claim 1 in which the end of the cylinder having the removable end closure has an outer frusto-conical surface and the associated end closure has a cooperating frusto-conical surface, and a clamping ring engages said surfaces to hold this end closure removably in position.

4. A gate valve as in claim 3 in which said removable end closure receives and guides the valve stem.

5. A gate valve as in claim 1 in which the spacing of the guide plates is maintained by threaded rods extending between and through the plates and nuts on the rods engaging said plates.

* * * * *